(12) United States Patent
Johansson

(10) Patent No.: US 8,125,893 B2
(45) Date of Patent: *Feb. 28, 2012

(54) METHOD, SYSTEM, AND NETWORK ENTITY FOR PERFORMING A SWITCH-OVER

(75) Inventor: Sixten Johansson, Espoo (FI)

(73) Assignee: Tellabs Oy, Espoo (FI)

( * ) Notice: Subject to any disclaimer, the term of this patent is extended or adjusted under 35 U.S.C. 154(b) by 983 days.

This patent is subject to a terminal disclaimer.

(21) Appl. No.: 10/695,410

(22) Filed: Oct. 27, 2003

(65) Prior Publication Data

US 2005/0021628 A1 Jan. 27, 2005

(51) Int. Cl.
*G06F 11/00* (2006.01)

(52) U.S. Cl. .................................. 370/217; 370/221

(58) Field of Classification Search ........... 370/216–228
See application file for complete search history.

(56) References Cited

U.S. PATENT DOCUMENTS

| | | | |
|---|---|---|---|
| 5,631,896 A * | 5/1997 | Kawase et al. ............ | 370/228 |
| 5,790,539 A | 8/1998 | Chao et al. | |
| 5,983,294 A | 11/1999 | Kim et al. | |
| 6,005,920 A * | 12/1999 | Fuller et al. ............ | 379/9.05 |
| 6,108,300 A * | 8/2000 | Coile et al. .............. | 370/217 |
| 6,195,330 B1 * | 2/2001 | Sawey et al. ............ | 370/220 |
| 6,751,191 B1 * | 6/2004 | Kanekar et al. .......... | 370/217 |
| 6,810,497 B2 * | 10/2004 | Yamada ................. | 714/724 |
| 7,093,027 B1 * | 8/2006 | Shabtay et al. .......... | 709/239 |
| 7,197,008 B1 * | 3/2007 | Shabtay et al. .......... | 370/218 |
| 7,324,500 B1 * | 1/2008 | Blackmon et al. ....... | 370/351 |
| 2003/0076857 A1 * | 4/2003 | Morita et al. ........... | 370/466 |
| 2004/0133368 A1 * | 7/2004 | Johansson et al. ........ | 702/58 |

FOREIGN PATENT DOCUMENTS

| | | |
|---|---|---|
| CN | 1333454 | 1/2002 |
| CN | 1373614 | 1/2002 |
| EP | 1 130 853 | 9/2001 |
| EP | 1 202 504 A2 | 5/2002 |
| EP | 1 223 788 A2 | 7/2002 |
| GB | 2 369 019 | 7/2002 |

* cited by examiner

*Primary Examiner* — Phuc Tran
(74) *Attorney, Agent, or Firm* — Young & Thompson

(57) ABSTRACT

A method, a system, and a network entity for performing the switch-over of a protected Label Switched Path (LSP) in (less than) 50 ms. A goal of the preferable arrangement is to move the tasks related to the switch-over away from the CPU to hardware (HW). The ASIC applies a communication protocol to signal a need for a switch-over between two (or several) units without CPU's participation. A unit, for example Sink of protected domain, which has detected a fault, sends a so-called protection message to a protection pair unit of the unit. The protection pair unit interprets the protection message and actives the connection on the protecting unit.

21 Claims, 7 Drawing Sheets

METHOD, SYSTEM, AND NETWORK ENTITY FOR PERFORMING A SWITCH-OVER

TECHNICAL FIELD OF THE INVENTION

The present invention relates generally to communicating data over a communication link.

BACKGROUND OF THE INVENTION

Ever since the formation of the global network of interconnected computing devices such as the Internet, there is being a huge emerging of various communication formats enabling these computing devices to communicate among themselves. This has created various services for users in business and non-business areas. In later half of 1990's we saw the boom of the Internet. A whole set of new services and content became available to the consumers during a short, revolutionary and hype intense period. That period introduced e-commerce, Internet Service Providers (ISPs), Portals, eyeballs game, dotcom companies and even the new economy.

However, many of the computing devices such as interconnected computers, servers and routers were originally designed for traditional packet based transmission, where association with real time event typically lacked. An example of such a communication is the web pages and web surfing. Also many trusted application such as banking could be taken care with possible delays. Even some of the fastest data communication ways such as Asynchronous Transfer Mode (ATM) were designed, despite of the ultimate data transfer speed, to quite delay tolerant environments. Lately the telecommunication industry has been highly focused on their leap towards using IP for telecommunication services.

However, these devices carry the heritage of delay tolerant based data communication. Consequently, there are still some remains of the elements and design in these devices, which will inevitably result in slowness of data processing in system level and delays in data communication. One example is the principal design for applications substantially based on non real time or alternatively expressed as delay tolerance.

Examples of such approaches have been presented in a system for a switch-over process depicted in FIG. 1. Typically the need for the switch-over is communicated via microprocessors. When a working connection (W) becomes faulty, an interrupt request is given to a microprocessor (CPU). After receiving the interrupt request, the CPU on the working side unit signals the CPU on the protection side unit, which then switches the traffic of the connection to a protecting connection (P). The system of FIG. 1 may have some configurable integrated circuit (IC) such as application-specific integrated circuit (ASIC) but not for the switch-over process, and the CPU's presence is crucial.

A disadvantage of the traditional switch-over based on CPU's communication is a slowness of the process. This is especially problematic with a large amount of connections, when the CPU has to handle a large number of interrupt requests. Therefore, the solutions are not adequate for any communication or connections requiring real time functionality. Moreover, the switch-over time is not fast enough with substantially real-time based connections, where a switch-over is typically required in less than 50 ms.

In view of various inherent limitations of communication and systems between computing devices, it would be desirable to avoid or mitigate these and other problems associated with prior art. Thus, there is a need to have a switch-over functionality for real time application.

SUMMARY OF THE INVENTION

Now a method, a system and a network entity have been invented for performing a switch-over functionality for real time application.

In accordance with a first aspect of the invention there is provided a system for performing a switch-over in data communication in accordance with a protection switching data communication principles, wherein the system comprises a configurable integrated circuit of a unit of the data communication for signaling a need for the switch-over in real time based data communication to a configurable integrated circuit of a protecting pair unit of said unit of the data communication.

In accordance with a second aspect of the invention there is provided a network entity for performing a switch-over in data communication in accordance with a protection switching data communication principles, wherein the network entity comprises a configurable integrated circuit of a unit of the data communication for signaling a need for the switch-over in real time based data communication to a configurable integrated circuit of a protecting pair unit of said unit of the data communication.

In accordance with a third aspect of the invention, there is provided a method for performing a switch-over in data communication in accordance with a protection switching data communication principles, wherein, the method comprises the step of signaling a need for the switch-over in real time based data communication from a configurable integrated circuit of a unit of the data communication to a configurable integrated circuit of a protecting pair unit of said unit of the data communication.

In preferred arrangement, method, system and network entity enable the switch-over of a protection switching connection such as Label Switched Path (LSP) in (less than) 50 ms. A goal of the preferable arrangement is to move the tasks related to the switch-over from the CPU to hardware (HW). The configurable integrated circuit (IC) applies a communication protocol to signal a need for a switch-over between two (or several) units without CPU's participation. Preferably, the configurable integrated circuit is based on application-specific integrated circuit (ASIC) or field-programmable gate array (FPGA).

A benefit of the embodied invention provides a solution with a very fast switch-over, approximately 2 µs, which makes it possible to do the switch-over for thousands of connections in less than 50 ms. This is further advantageous in any data communication requiring real time function.

For better understanding of the present invention reference is made to the following description, taken in conjunction with the accompanying drawings, and its scope will be pointed out in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
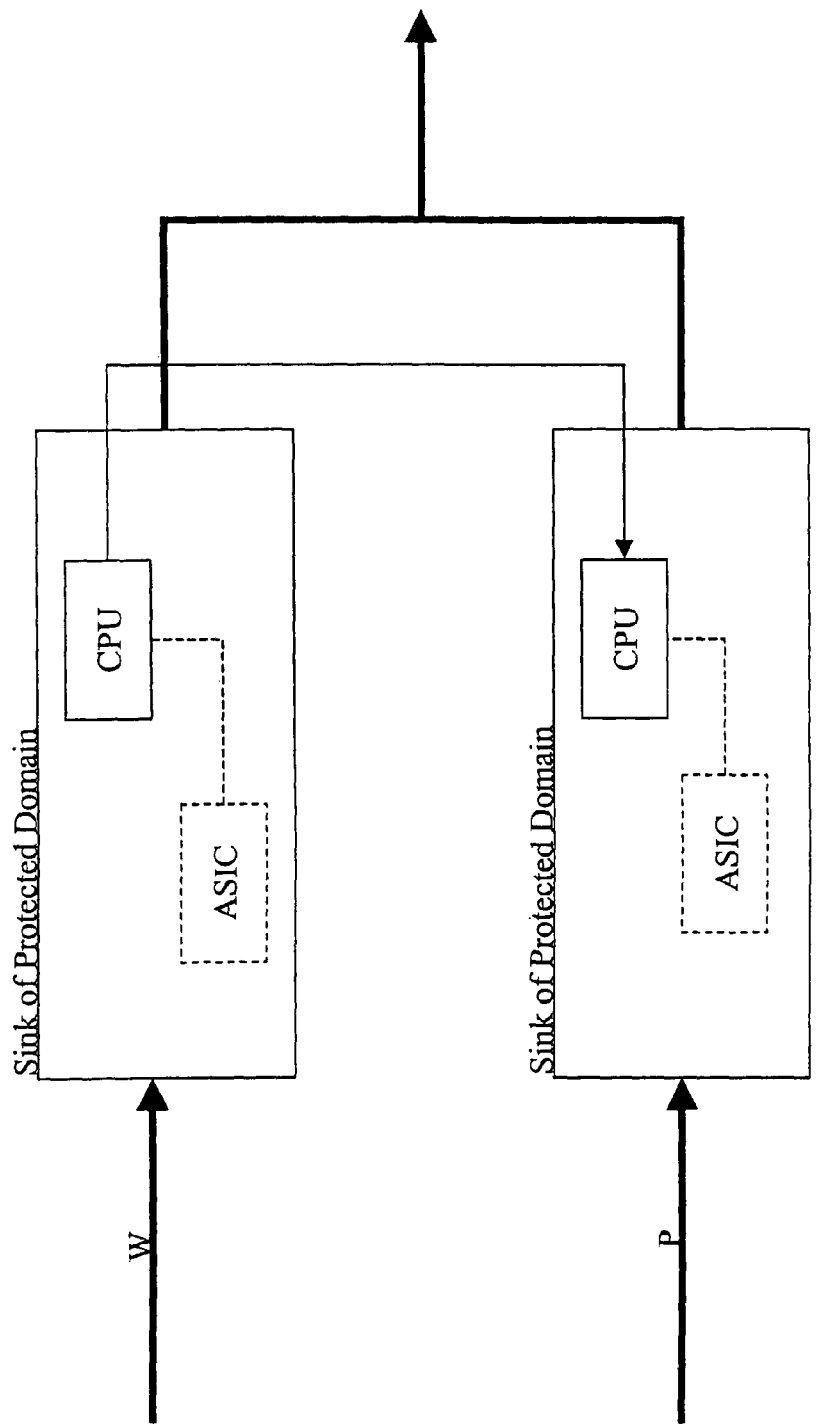
FIG. 1 depicts a switch-over procedure in prior art system.

The preferred embodiments of the invention provide a method, a system, and a network entity for performing the switch-over of a protection switching connection such as Label Switched Path (LSP) in (less than) 50 ms. A goal of the preferable arrangement is to move the tasks related to the switch-over away from the CPU to hardware (HW). The configurable integrated circuit (IC) applies a communication protocol to signal a need for a switch-over between two (or several) units without CPU's participation. Preferably, the configurable integrated circuit is based on application-specific integrated circuit (ASIC) or field-programmable gate array (FPGA). A unit, for example a working unit of Sink of protected domain, which has detected a fault, sends a so-called protection message to a protection pair unit of the unit. The protection pair unit interprets the protection message and actives the connection on the protecting unit. Alternatively, the protection message can be used as well to inform the other unit that the connection is functioning and unfaulty, not only for informing the protecting unit about a faulty connection.

The appliance of the embodied invention for real time data communication provides also an advantage over the current Voice over IP (VoIP) solutions as the monitoring of the network traffic, which is based on the label(s) as defined in the MPLS and Ethernet based solution, is considerably faster than the current solution of the VoIP.

The connection comprises a functional connection between a Source and the Sink in a system of interconnected computing devices in accordance with the protection switching data communication principles. Preferably, the connection comprises fast IP based connection for various appliances such as web application, e-mail, file transfer, host sessions, newsgroups, directory services, network management, and file services. The examples are described in the OSI reference model. Preferably, the Source and the Sink are coupled via the optical fiber. Alternatively, a cable coupling such as a copper cable coupling or a radio link coupling can be applied as well. The switch-over takes place for the previous connection (typically working connection), which suffers from the faulty connection or alternatively referred to as a connection error or a failure during the data communication. The faulty connection can be a physical or functional between the Source and the Sink and can be caused by termination of the capability of an entity to transfer user or OAM (Operation and Maintenance) information.

Some embodiments of the invention apply configurable Integrated Circuit (IC). ASIC (application-specific integrated circuit) is a microchip designed for a special application, such as a particular kind of transmission protocol or a hand-held computer. Typically ASIC is contrasted with general integrated circuits, such as the microprocessor and the random access memory chips in, for example, PC. ASICs are used in a wide-range of applications, including auto emission control, environmental monitoring, and personal digital assistants (PDAs). The ASIC can be pre-manufactured for a special application or it can be custom manufactured (typically using components from a "building block" library of components) for a particular customer application. Preferably, data processing of CPU in the switch-over process can be moved to ASICs, thereby reducing any dependency such as the processing time on the CPU. Alternatively, a field-programmable gate array (FPGA) can be applied. The FPGA is an integrated circuit (IC) that can be programmed in the field after manufacture. FPGAs are similar in principle to, but have vastly wider potential application than, programmable read-only memory (PROM) chips.

In the following technical details on principles on protection switching is provided for some embodiments of the invention.

Protection switching is a fully allocated protection mechanism that can be used on any topology. It is fully allocated in the sense that the route and bandwidth of the protection entity is reserved for a selected working entity. To be effective under all possible failures of the working entity however, the protection entity must be known to have complete physical diversity over all common-failure modes. This may not always be possible.

The LSP based architecture can be a 1+1 type, a 1:1 type, or 1:N type, and all can be applied in the embodied invention.

Figure 2:
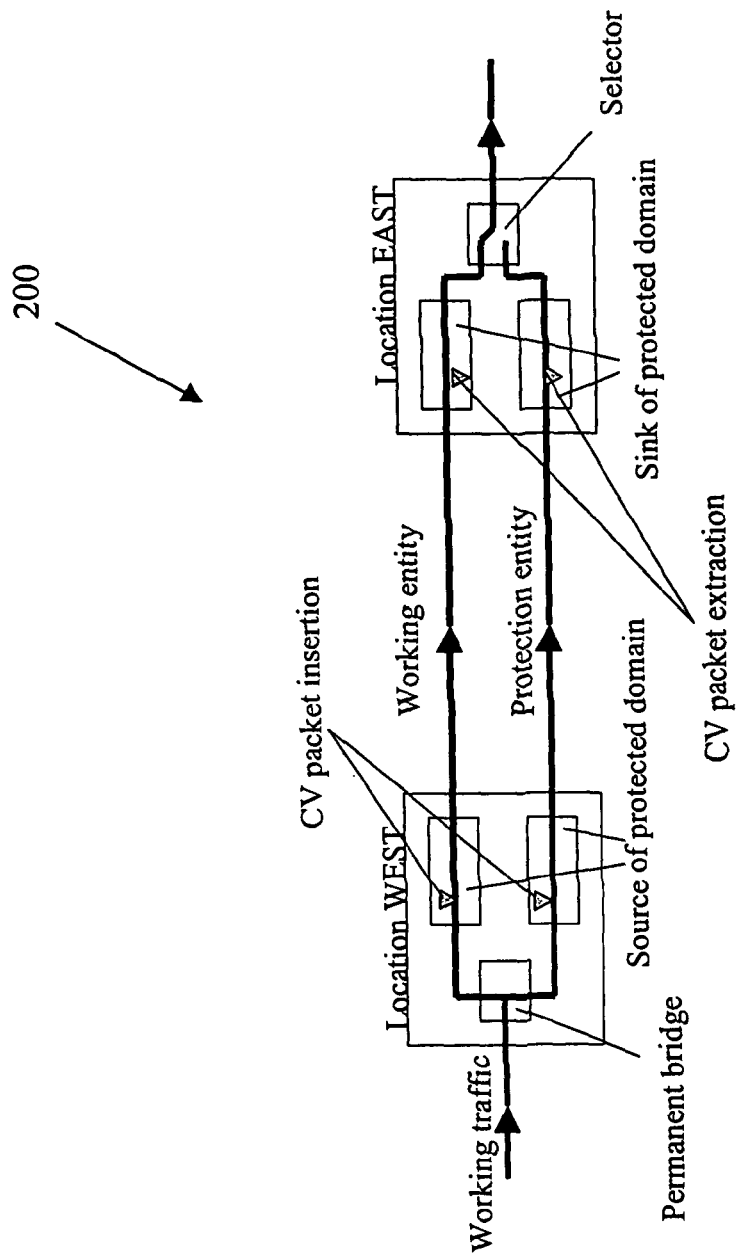
FIG. 2 depicts an example of 1+1 protection switching architecture.

In the 1+1 architecture type, a protection entity is dedicated to each working entity with the working entity bridged onto the protection entity at the source of the protected domain. The traffic on working and protection entities is transmitted simultaneously to the sink of the protected domain, where a selection between the working and protection entity is made based on some predetermined criteria, such as defect indication. An example of the 1+1 architecture (200) is depicted in the FIG. 2.

In the 1:1 architecture type, a protection entity is dedicated to each working entity. The working traffic is transmitted either by working or protection entity. The method for a selection between the working and protection entities depends on the mechanism. The protection entity can be used to carry (so-called) "extra traffic" when it is not used to transmit the working traffic.

Some more technical details on the protection switching can be found from a standardization specification draft Y. 1720 "Protection Switching for MPLS networks" COM 13-R 14-E June 2001, incorporated herein as a reference.

Some embodiments of the invention apply real time communication. The real time can be considered as a level of computer responsiveness that a user senses as sufficiently immediate or that enables the computer to keep up with some external process (for example, to present visualizations of the weather as it constantly changes). The real-time is an adjective pertaining to computers or processes that operate in real time. The real time describes a human rather than a machine sense of time. The real time based data communication or connections are highly relevant in telecommunication, especially when the IP appliance is used.

Some embodiments of the invention apply Multiprotocol Label Switching (MPLS). The MPLS is a standards-approved technology for speeding up network traffic flow and making it easier to manage. MPLS involves setting up a specific path for a given sequence of packets, identified by a label put in each packet, thus saving the time needed for a router to look up the address to the next node to forward the packet to MPLS is called multiprotocol because it works with the Internet Protocol (IP), Asynchronous Transport Mode (ATM), and frame relay network protocols. With reference to the standard model for a network (the Open Systems Interconnection, or OSI model), MPLS allows most packets to be forwarded at the layer 2 (switching) level rather than at the layer 3 (routing) level. In addition to moving traffic faster overall, MPLS makes it easy to manage a network for quality of service (QoS). For these reasons, the technique is expected to be readily adopted as networks begin to carry more and different mixtures of traffic.

The invention can be applied in many kinds of networks (not just the MPLS) where the protection switch-over kind of mechanism is used for protecting connection existence. As an example, the appliance in Ethernet based communication providing very fast data transfer. Fast Ethernet provides transmission speeds up to 100 megabits per second and is typically used for LAN, WAN, and MAN backbone systems, supporting workstations with network cards. Gigabit Ethernet provides an even higher level of backbone support at 1000 megabits per second (1 gigabit or 1 billion bits per second). 10-Gigabit Ethernet provides up to 10 billion bits per second.

Fast Ethernet is a local area network (LAN) transmission standard that provides a data rate of 100 megabits per second. Alternatively, it can be applied in wide area networks (WANs) and metropolitan area networks (MANs). Workstations with existing 10 megabit per second Ethernet card can be connected to a Fast Ethernet network. (The 100 megabits per second is a shared data rate; input to each workstation is constrained by the 10 Mbps card.)

Gigabit Ethernet, a transmission technology based on the Ethernet frame format and protocol used in local area networks (LANs), provides a data rate of 1 billion bits per second (one gigabit). Alternatively, it can be applied in wide area networks (WANs) and metropolitan area networks (MANs). Gigabit Ethernet is defined in the IEEE 802.3 standard and is currently being used as the backbone in many enterprise networks. Gigabit Ethernet is carried primarily on optical fiber (with very short distances possible on copper media). Existing Ethernet LANs with 10 and 100 Mbps cards can feed into a Gigabit Ethernet backbone. An alternative technology that competes with Gigabit Ethernet is ATM.

A newer standard, 10-Gigabit Ethernet, is also becoming available. 10-Gigabit Ethernet, being standardized in IEEE 802.3ae, is a developing telecommunication technology that offers data speeds up to 10 billion bits per second. Built on the Ethernet technology used in most of today's local area networks (LANs), 10-Gigabit Ethernet is described as a "disruptive" technology that offers a more efficient and less expensive approach to moving data on backbone connections between networks while also providing a consistent technology end-to-end. Using optical fiber, 10-Gigabit Ethernet can replace existing networks that use ATM switches and SONET multiplexers on an OC-48 SONET ring with a simpler network of 10-Gigabit Ethernet switches and at the same time improve the data rate from 2.5 Gbps to 10 Gbps. 10-Gigabit Ethernet is used to interconnect local area networks (LANs), wide area networks (WANs), and metropolitan area networks (MANs). 10-Gigabit Ethernet uses the familiar IEEE 802.3 Ethernet media access control (MAC) protocol and its frame format and size. Like Fast Ethernet and Gigabit Ethernet, 10-Gigabit Ethernet uses full-duplex transmission, which makes possible a considerable distance range. On multimode fiber, 10-Gigabit Ethernet will support distances up to 300 meters; on single mode fiber, it will support distances up to 40 kilometers. Smaller Gigabit Ethernet networks can feed into a 10-Gigabit Ethernet network.

Figure 3:
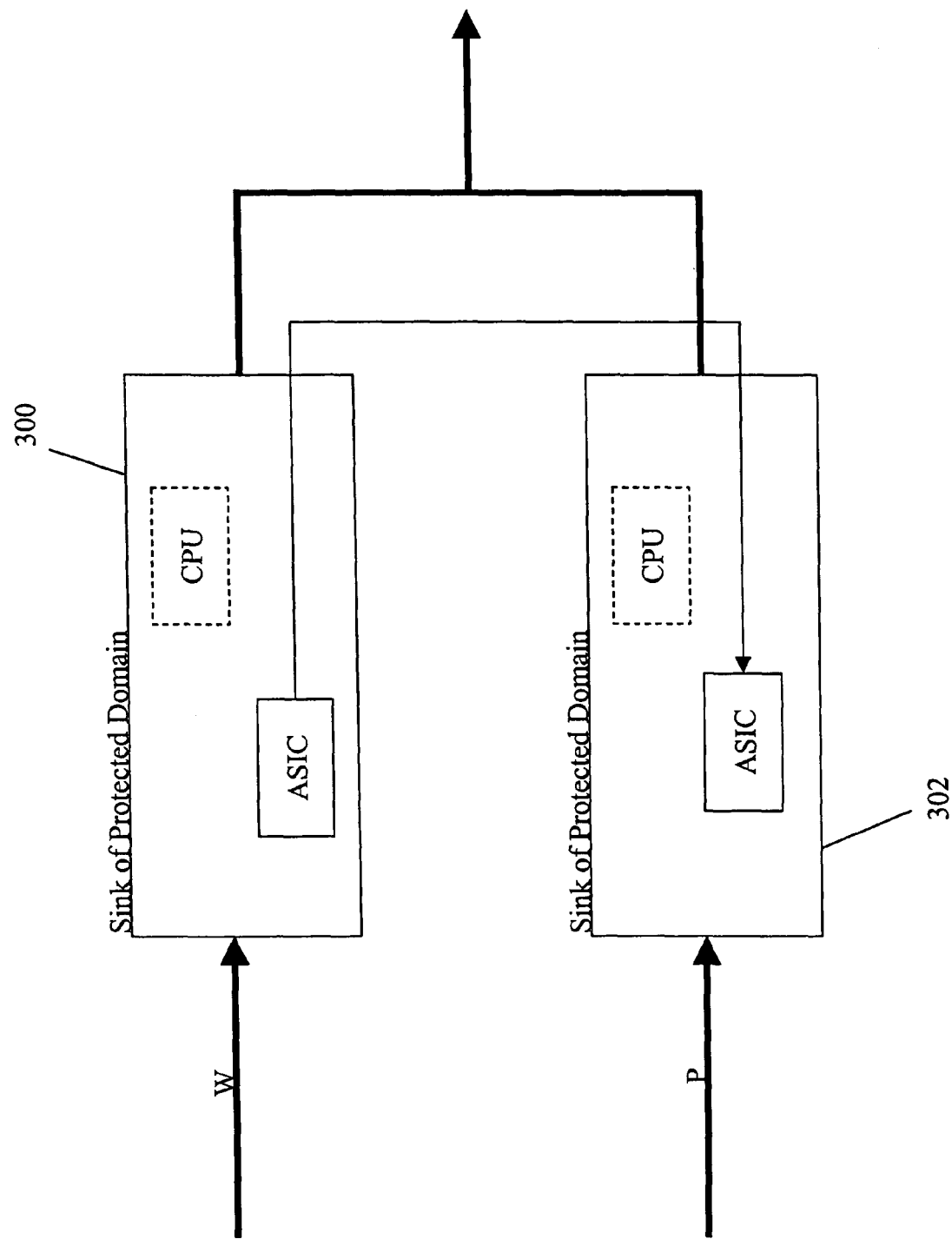
FIG. 3 depicts an example of a system for a switch-over procedure in accordance with an embodiment of the invention.

FIG. 3 depicts an example of a system for a switch-over procedure in accordance with an embodiment of the invention. The system of the exemplary FIG. 3 comprises two units or alternatively referred to as network entities: A unit (300) for working connection of the protected connection operating as a Sink, and a protecting pair unit (302) for protecting connection of the protected connection operating also as the Sink. Both units (300,302) comprise ASIC for performing the switch-over procedure. Further both units (300,302) may comprise CPU for centralized control of the unit. However, the ASICs can be and operate independently of the CPU. The unit (300) detects a connection fault. The unit (300) sends a protection message to the protection pair unit (302). The protection pair unit (302) receives the message and, accordingly interprets the protection message. The communication of the message is between the ASICs and no CPU attendance is required. The protection pair unit (302) activates the connection on the protecting unit (302).

Figure 4:
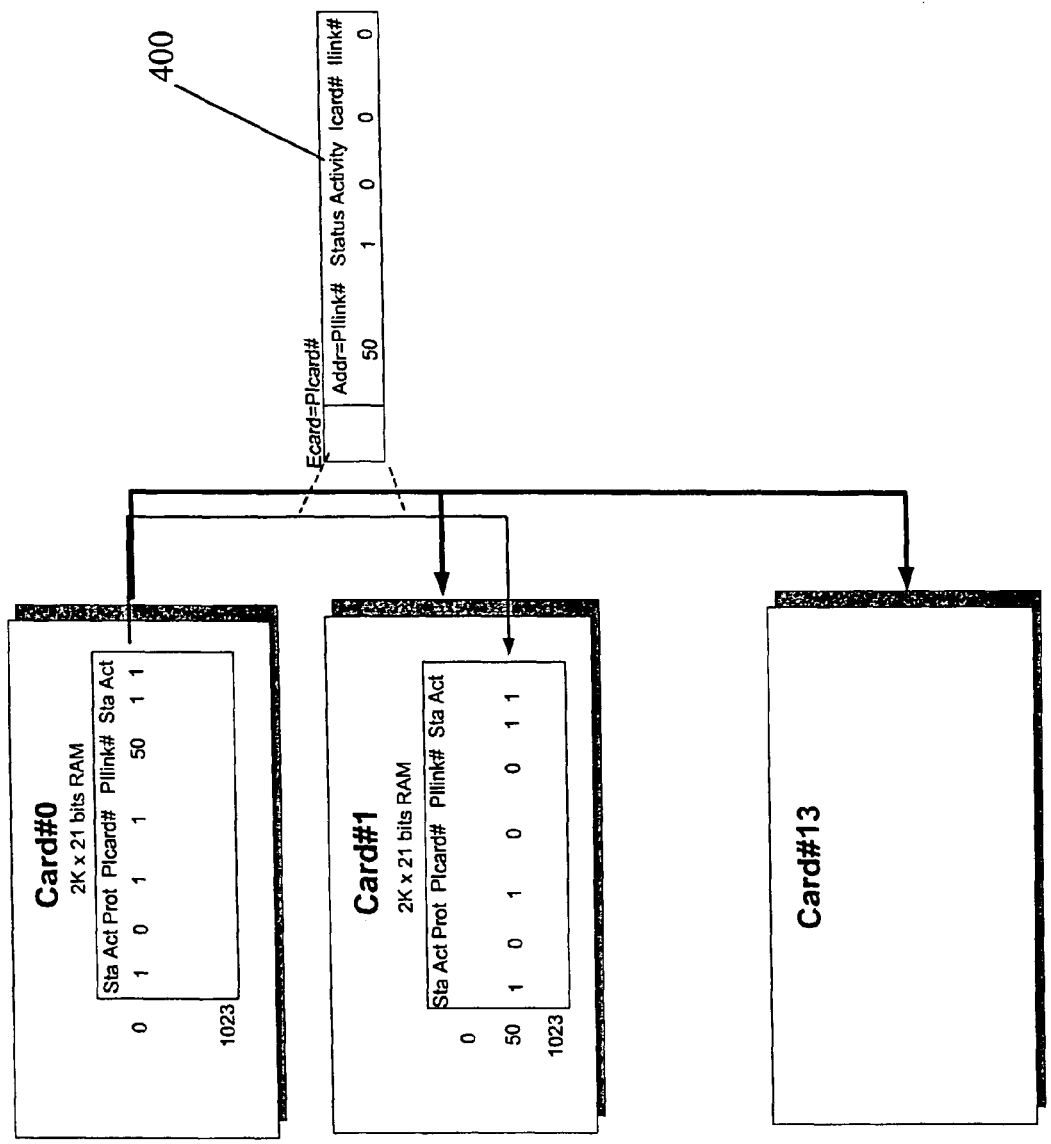
FIG. 4 depicts a further example of a system for a switch-over procedure in accordance with an embodiment of the invention.

FIG. 4 depicts a further example of a system for a switch-over procedure in accordance with an embodiment of the invention. In the example of FIG. 4, 14 cards (Card#0, Card#1-Card#13) have been depicted to present ASIC based card used in the protection switching system as the Sink end. The amount of the card is randomly selected, and each card can have any random number of connections. The Card#0 detects a connection fault. Card#0 sends a protection message (400) to Card #1 to inform that the connection on Card#0 is down. The Card #1 can act as a part of the protecting pair unit, and Card #0 can act as a part of the working unit. Alternatively, the cards are referred to as units. The cards can be and operate independently of any CPU of the Sink. The Card #1 receives the message and, accordingly interprets the protection message. The Card #1 activates the connection on the protecting unit.

Figure 5:
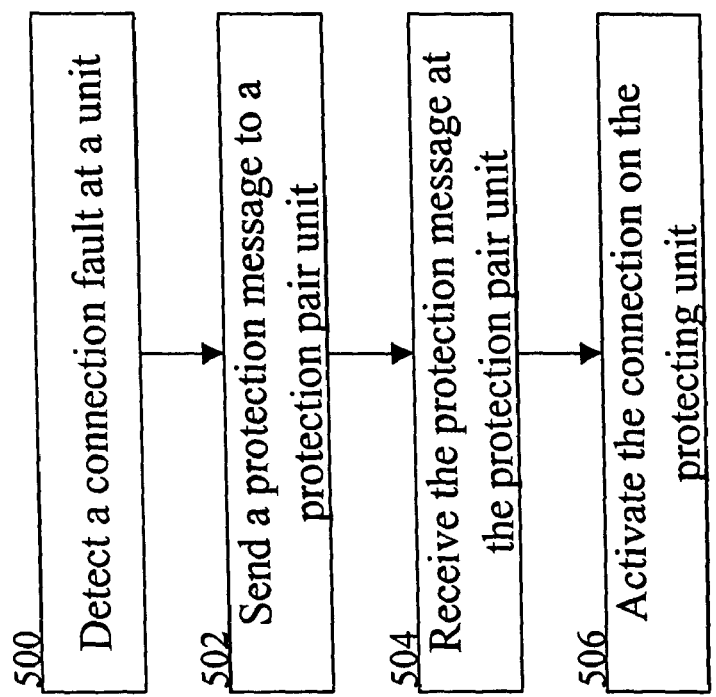
FIG. 5 depicts in a form of a flow chart a method for performing a switch-over in accordance with an embodiment of the invention.

FIG. 5 depicts in a form of a flow chart a method for performing a switch-over in accordance with an embodiment of the invention. In step 500 there is detected a connection fault in a unit. The detection can take place at either one unit the working or the protecting. The one, which has detected the fault, sends a protecting message to the protection pair unit in step 502. The protection pair unit receives the message in step 504. The message is conveyed via the ASIC based connection between the units. The protection pair unit interprets the message. In step 506 the protection pair unit activates the connection on the protecting unit. The unit (300) of the FIG. 3 can operate as the working unit, and the unit (302) of FIG. 3 can operate as the protection unit. Similarly, for example, Card#0 can be a part of the working unit and Card #1 can be a part of the protecting unit respectively.

Figure 6:
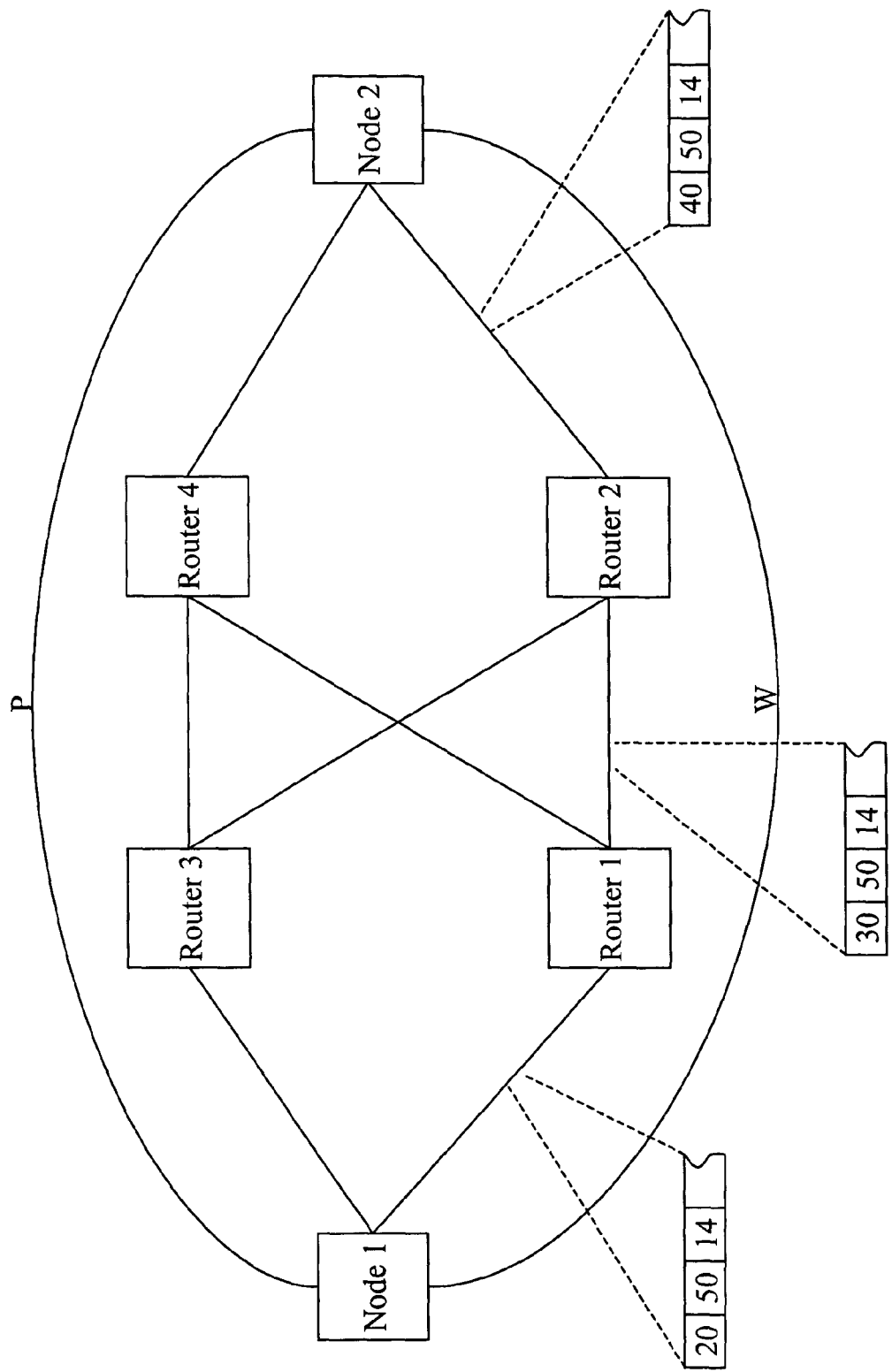
FIG. 6 depicts an embodiment of a network system in which the principles of the invention are applied.

FIG. 6 depicts an embodiment of a network system in which the principles of the invention are applied. The example of FIG. 6 applies the protected connection, and is based on the 1+1 protection switching architecture. A functional working connection (W) and a functional protecting connection (P) couples a node 1 with node 2 preferably via fast data transfer means. Preferably, optical fiber based data transfer lines are applied. Alternatively, the cable coupling such as the copper cable coupling or the radio link coupling can be applied as well. Typically, the data transfer means establishes a backbone of IP based network connection. The system of FIG. 6 can operate as the large backbone network using IP for telecommunication services, and the MPLS can be applied as the bearer for such a network. The nodes 1 and 2 can be a data computing device operating in a data networks such as a computer server. The coupling of the node 1 and the node 2 is via routers 1, 2 and 3, 4, which may also cross. The LSP is established between the nodes via the routers. Data connection packets depicted in the FIG. 6 depicts the segment id (20,30,40) for different segment of the Path, the id (50), and OAM packets (14). The data flow is generated in the Node 1.

Thus, the node 1 is acting as a Source LSR (Label Switched Router) for the LSP. The flow and the LSP is eventually directed to the node 2. Thus, the node 2 is acting as eventual Sink LSR for the LSP. The monitoring of the data flow is preferably operating at the Sink. Alternatively the monitoring can take place at network Routers such as LSR Sink, which does not necessary act as the final receiving end for the flow but can convey the flow forward.

Figure 7:
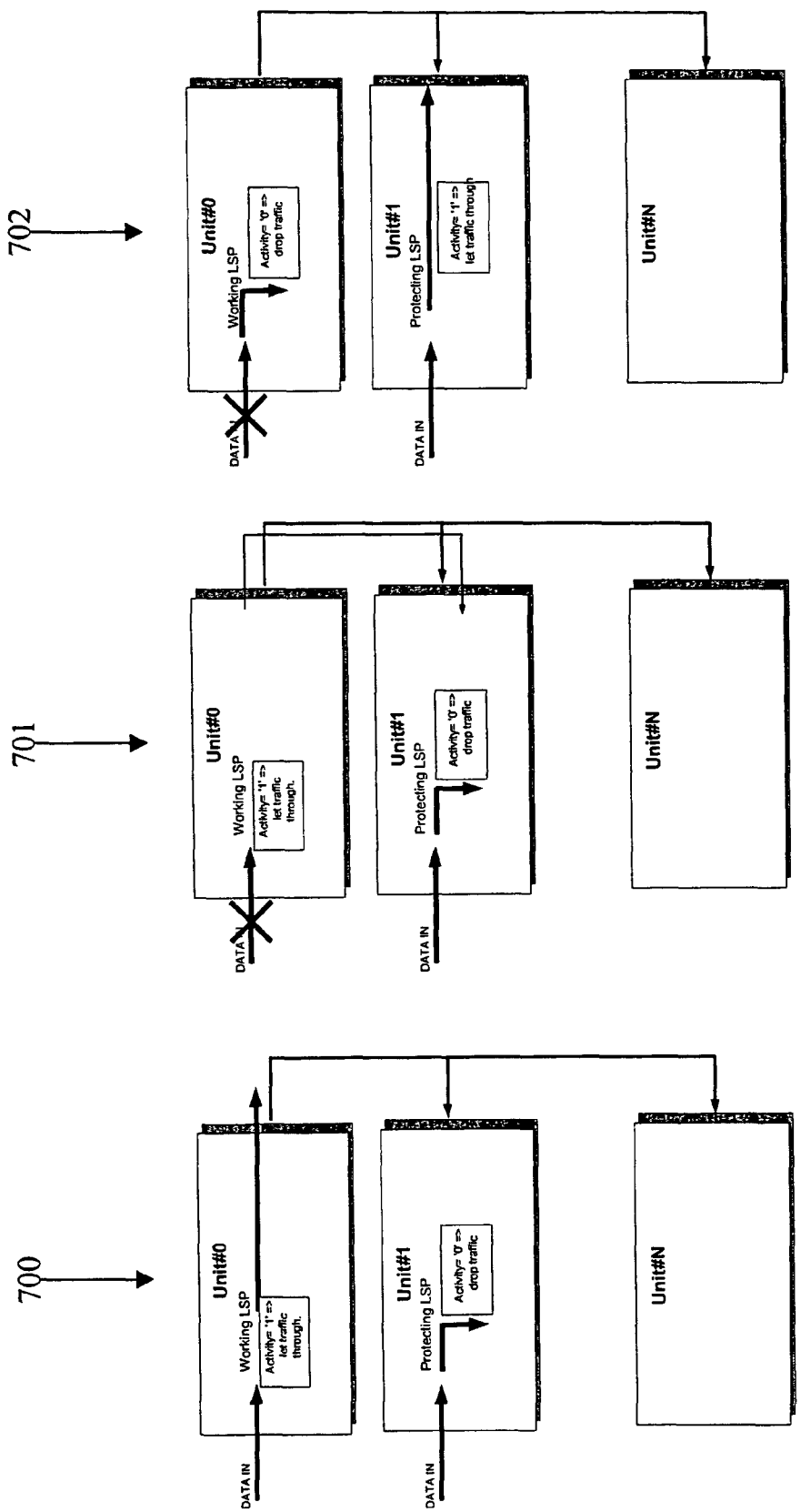
FIG. 7 depicts an example of a switch-over for LSP 1+1 protection connection in accordance with an embodiment of the invention.

FIG. 7 depicts an example of a switch-over for LSP 1+1 protection connection in accordance with an embodiment of the invention. The example of FIG. 7 applies 1+1 protection connection, in which the switch-over process in principally performed at the Sink. In the case of 1:1 or 1:N protection switching type, the switch-over process is principally performed at the Source. In step 700 both connections (working connection (W) and protection connection (P)) are operating normally, and the status for the connections is OK. In Unit#0 Activity status is "1" for letting traffic through, and in Unit#1 the Activity status is "0" for dropping the traffic. In step 701 the working connection fails. Thus, there occurs the connection failure in the working connection. The Unit#0 detects the failure, and signals/sends the signal (400) to Unit#1. Advantageously, the monitoring and signaling is performed without CPU participation between the ASICs of the units. In step 702 the working connection has the failure and the protection connection is active. The Unit#1 has received the signal (400) and the switch-over is performed at the Sink. In Unit#0 Activity status is "0" for dropping the traffic, and in Unit#1 Activity status is "1" for letting the traffic through.

Although the protection message has been described to indicate the switch-over need in the case of connection fault, alternatively, the protection message can be used to inform the other unit that the connection is functioning and unfaulty, not only for informing the protecting unit about a faulty connection.

The system, the network entity, and the computer program product can apply the procedures of the method described in the example of FIG. 5. Consequently, the method can operate in the examples of FIGS. 3, 4, 6 and 7.

The embodiments are described to be based on the ASIC. It should be noted that the FPGA based solution can be applied as well.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. Consequently, the options of implementing the invention as determined by the claims, including the equivalents, also belong to the scope of the present invention.

The invention claimed is:

1. A system for performing a switch-over in data communication within a data computing device in accordance with protection switching data communication principles, said system comprising said data computing device arranged to operate in a data network according to the protection switching data communication principles, the data computing device comprising:
   a first unit; and
   a protection pair unit;
   wherein a configurable integrated circuit of said first unit is arranged to send a signal that signals a need for the switch-over in real time based data communication to a configurable integrated circuit of the protection pair unit, and
   wherein said configurable integrated circuit of said protection pair unit is structured and arranged to perform the switch-over independently of a CPU, when the switch-over is needed.

2. The system according to claim 1, wherein the system provides the signaling between the first unit and the protection pair unit without a participation of the CPU.

3. The system according to claim 1, wherein each of the configurable integrated circuits comprises at least one of application-specific integrated circuit and field-programmable gate array.

4. The system according to claim 3, wherein each of said configurable integrated circuits is an application-specific integrated circuit.

5. The system according to claim 1, wherein the protection switching comprises a protected LSP based on a working connection and a protecting connection.

6. The system according to claim 1, wherein said first unit comprises a working unit in accordance with a LSP working connection and the protection pair unit comprises a protection unit in accordance with a LSP protection connection.

7. The system according to claim 6, wherein said working unit comprises a card and said protection unit comprises another card.

8. The system according to claim 1, wherein the signal comprises a protection message for delivering that the data communication of a receiving unit is at least one of faulty and unfaulty.

9. The system according to claim 1, wherein the real time based data communication presumes the switch-over to take place in less than 50 milliseconds from an occurrence of a connection fault.

10. The system according to claim 1, wherein the data communication comprises at least one of Internet Protocol, Ethernet, and MPLS for real time telecommunication services.

11. The system according to claim 1, wherein Multiprotocol Label Switching is contained as a bearer for the data communication.

12. The system according to claim 1, wherein the real time based data communication is such that human senses any application based on the real time based data communication substantially immediate.

13. The system according to claim 1, wherein the data communication takes place between a source computing entity and a sink computing entity.

14. The system according to claim 13, wherein Multiprotocol Label Switching operates as a backbone for IP based data communication.

15. The system according to claim 1, wherein said first unit comprises a card and said protection pair unit comprises another card.

16. The system according to claim 1, wherein said first unit is structured and arranged to send a protection message to said protection pair unit, said protection pair unit is structured and arranged to interpret the message and perform the switch-over, if necessary.

17. A data computing device for performing a switch-over in data communication within said data computing device in accordance with a protection switching data communication principles, said data computing device is structured and arranged to operate in a data network according to the protection switching data communication principles, the data computing device comprising:
   a first unit; and
   a protection pair unit;

wherein a configurable integrated circuit of said first unit is arranged to send a signal that signals a need for the switch-over in real time based data communication to a configurable integrated circuit of the protection pair unit, and wherein said configurable integrated circuit of said protection pair unit of said data computing device is structured and arranged to perform the switch-over independently of a CPU, when the switch-over is needed.

18. The data computing device according to claim 17, wherein the configurable integrated circuit of the first unit is embodied on a first configurable integrated circuit card and the configurable integrated circuit of the protection pair unit is embodied on a second configurable integrated circuit card.

19. A method for performing a switch-over in data communication within a data computing device in accordance with a protection switching data communication principles, the method comprising:

signaling a need for the switch-over in real time based data communication from a configurable integrated circuit of a first unit of said data computing device to a configurable integrated circuit of a protection pair unit of said data computing device; and performing the switch-over by said configurable integrated circuit of said protection pair unit of said data computing device independently of a CPU, wherein said data computing device is arranged to operate in a data network according to the protection switching data communication principles and contains both the configurable integrated circuit of said first unit and said configurable integrated circuit of said protection pair unit.

20. The method according to claim 19, further comprising before the step of signaling the step of detecting a connection fault in the data communication at the first unit.

21. The method according to claim 19, further comprising the step of receiving the signal indicating the need for the switch-over at the protection pair unit and performing the switch over by activating the data communication on the protection pair unit.

* * * * *